(12) United States Patent
Chaushev

(10) Patent No.: US 7,707,155 B2
(45) Date of Patent: Apr. 27, 2010

(54) SYSTEM AND METHOD FOR EFFICIENTLY FILTERING AND RESTORING TABLES WITHIN A MULTI-TIERED ENTERPRISE NETWORK

(75) Inventor: Rosen A Chaushev, Sofia (BG)

(73) Assignee: SAP AG, Walldorf (DE)

( * ) Notice: Subject to any disclaimer, the term of this patent is extended or adjusted under 35 U.S.C. 154(b) by 330 days.

(21) Appl. No.: 11/320,308

(22) Filed: Dec. 27, 2005

(65) Prior Publication Data

US 2007/0150505 A1 Jun. 28, 2007

(51) Int. Cl.
G06F 7/00 (2006.01)
(52) U.S. Cl. .......................................... 707/101; 707/2
(58) Field of Classification Search ................. 707/102, 707/2, 101
See application file for complete search history.

(56) References Cited

U.S. PATENT DOCUMENTS

| | | | |
|---|---|---|---|
| 5,293,615 A | | 3/1994 | Amada |
| 5,878,423 A | | 3/1999 | Anderson et al. |
| 2001/0013009 A1 | | 8/2001 | Greening et al. |
| 2004/0030689 A1 | | 2/2004 | Anderson et al. |
| 2004/0045005 A1 | * | 3/2004 | Karakashian ............... 719/310 |
| 2004/0064503 A1 | * | 4/2004 | Karakashian et al. ....... 709/203 |
| 2005/0021428 A1 | | 1/2005 | Costello |
| 2006/0004794 A1 | * | 1/2006 | Pizzo et al. .................. 707/100 |
| 2006/0047587 A1 | | 3/2006 | Desai et al. |
| 2006/0053096 A1 | | 3/2006 | Subramanian et al. |
| 2006/0095833 A1 | | 5/2006 | Orchard et al. |
| 2006/0106844 A1 | | 5/2006 | Naick et al. |
| 2006/0143162 A1 | * | 6/2006 | Bernacki et al. ................ 707/3 |

OTHER PUBLICATIONS

Author: Martin Bond, Dan Haywood, Debbie Law, Andy Longshaw and Peter Roxburgh Title: Sams Teach Yourself J2EE in 21 Days Date: Apr. 2002 Publisher: Sams Publishing Pertinent pp. 9,21-23, 45, 502, 546-549, 793-795.*
Author: Sun Microsystems Tilte: JDBCTM RowSet Implementations Specification JSR 114 Final Draft. Date: Apr. 7, 2004. Publisher: Sun Microsystems, Inc. Edition: Final Draft. Pertinent pp. 1-90 (pages are renumbered on the attached pdf file by examiner).*
Final Office Action for U.S. Appl. No. 11/395,680; Mailed Jul. 30, 2009; 33 pages.

* cited by examiner

Primary Examiner—Tim T. Vo
Assistant Examiner—Anh Tai V Tran
(74) Attorney, Agent, or Firm—Blakely Sokoloff Taylor & Zafman LLP

(57) ABSTRACT

A system and method are described for efficiently filtering and restoring tables within an enterprise application server. For example, one embodiment of the invention detects that a filtering function has been selected for a particular table node and responsively stores elements from the table node within a backup table collection. The filtering function is then performed to generate a filtered table node containing a subset of elements specified by the filtering function. Subsequently, upon detecting that the filtering function has been disabled, the table node may be restored from the backup table collection.

11 Claims, 7 Drawing Sheets

SYSTEM AND METHOD FOR EFFICIENTLY FILTERING AND RESTORING TABLES WITHIN A MULTI-TIERED ENTERPRISE NETWORK

BACKGROUND

1. Field of the Invention

This invention relates generally to the field of data processing systems. More particularly, the invention relates to a system and method for efficiently filtering and restoring tables within a multi-tiered enterprise network.

2. Description of the Related Art

Multi-Tiered Enterprise Computing Systems

Traditional client-server systems employed a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile or "persistent" storage for the data accessed and/or processed by the application 102.

The "business logic" component of the application represents the core program code of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1b. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logical components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1b may be implemented using a variety of different application technologies at each of the layers of the multi-tier architecture, including those based on the Java 2 Enterprise Edition™ ("J2EE") standard, the Microsoft .NET standard and/or the Advanced Business Application Programming ("ABAP") standard developed by SAP AG. For example, as described below, in a J2EE environment, the business layer 122, which handles the core business logic of the application, is comprised of Enterprise Java Bean ("EJB") components with support for EJB containers. Within a J2EE environment, the presentation layer 121 is responsible for generating servlets and Java Server Pages ("JSP") interpretable by different types of browsers at the user interface layer 120.

J2EE Application Server Architecture

FIG. 2a illustrates a typical J2EE application server 200 in which the presentation layer is implemented by a "Web container" 211 and the business layer is implemented by an Enterprise Java Bean ("EJB") container 201. Containers are runtime environments which provide standard common services 219, 209 to runtime components. For example, the Java Naming and Directory Interface ("JNDI") is a service that provides application components with methods for performing standard naming and directory services. Containers also provide unified access to enterprise information systems 217 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors.

As illustrated in FIG. 2a, each layer of the J2EE architecture includes multiple containers. The Web container 211, for example, is itself comprised of a servlet container 215 for processing servlets and a Java Server Pages ("JSP") container 216 for processing Java server pages. The EJB container 201 includes three different containers for supporting three different types of enterprise Java beans: a session bean container 205 for session beans, a entity bean container 206 for entity beans, and a message driven bean container 207 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

Table Generation and Filtering

The display of data records in tables and forms and the associated editing of the tables and forms (e.g., selecting, deleting, sorting, etc) by clients are central functions in Web-based applications. Thus, various techniques are provided within the J2EE architecture for creating and working with tables in response to client requests. In particular, under a model-view-controller ("MVC") architecture, illustrated in FIG. 2b, Web-based content using tables may be created within the Web Container 211 using "controllers" 240 and "views" 251-252 that operate in conjunction with "models" 260 within the EJB container 201. A detailed description of the MVC architecture is beyond the scope of the present application but, briefly, the controller 240 manages the underlying table structure and data, referred to in FIG. 2b as a table node 250. The table structure is presented to Web clients 220 in the form of one or more "views" 251-252 which indicate, for example, how the table is presented within a Web page. Controllers may be implemented by servlets and views by Java server pages. The model 260 within the EJB container 201 provides an interface between the controller 240 and the underlying table data stored within the database 123. See, e.g., GHALY and KOTHAPALLI mentioned above for additional detail on the MVC architecture at pages 148-152.

Once the table node 250 is generated, it may be filtered and/or otherwise modified in response to requests from Web clients. For example, as part of a search request a Web client may designate a filtering operation such as "only display client records in the table beginning with the letters DE." As a result the table node will be filtered and the results provided to the client.

One problem which existed in prior configurations, however, was the manner in which the table node was restored following a filtering operation. In particular, following a filtering operation, if a user desired to once again view the unfiltered table (or to perform a new filtering operation), the system would fully restore the table node (e.g., via communication with the EJB container 201 and/or database), thereby consuming a considerable amount of processing capacity and bandwidth. Accordingly, more efficient techniques for table filtering and regeneration are needed.

SUMMARY

A system and method are described for efficiently filtering and restoring tables within an enterprise application server. For example, one embodiment of the invention detects that a filtering function has been selected for a particular table node and responsively stores elements from the table node within a backup table collection. The filtering function is then performed to generate a filtered table node containing a subset of elements specified by the filtering function. Subsequently, upon detecting that the filtering function has been disabled, the table node may be restored from the backup table collection.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for filtering tables within a multi-tiered enterprise network. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

In order to solve the problems in prior systems associated with table filtering and restoration (see, e.g., FIG. 2b above and associated text), one embodiment of the invention saves the elements of the table node in a backup table collection in response to detecting a table filtering operation. Subsequently, when the filtering operation is switched off, the table node is restored from the backup collection rather than being regenerated from scratch and wasting processing resources and bandwidth.

Figure 3:
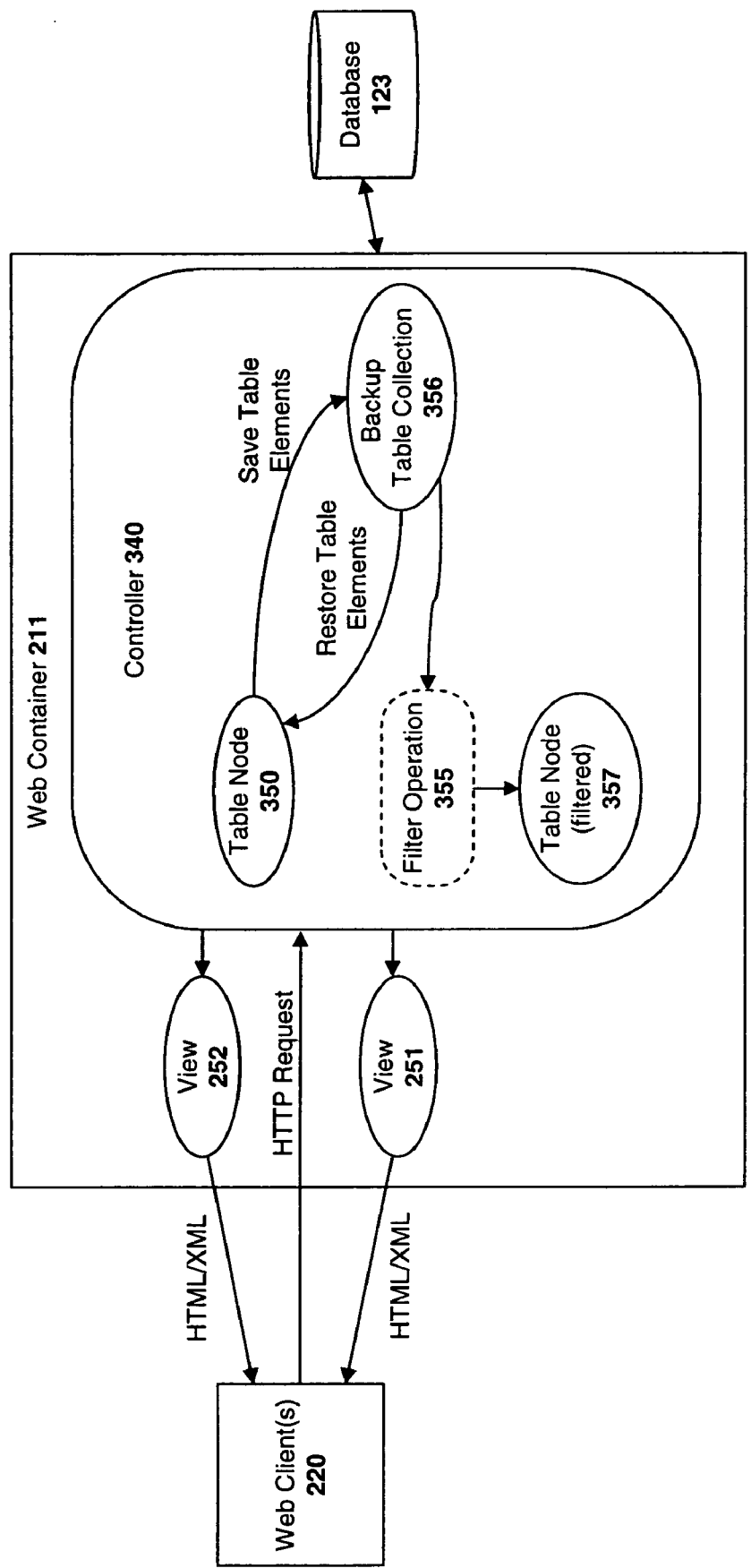
FIG. 3 illustrates one embodiment of a system for efficiently filtering and restoring tables within an enterprise network.

FIG. 3 illustrates one embodiment of the invention which addresses the foregoing limitations. In this embodiment, in response to detecting a filtering operation on data stored within a table node 250 (i.e., turning on the filter in response to a request from a client 220), a backup table collection 356 is generated. In one embodiment, the backup table collection 356 includes all of the table elements contained within the table node 350.

The filtering operation 355 designated by the client 220 may then be performed on the backup table collection 356 to generate a filtered table node 357. A virtually unlimited number of filtering operations may be performed to generate the table node 357. For example, as mentioned above, a user may specify a certain date range for records within the table, or may indicate a certain sequence of characters (e.g., the letters "DR").

In one embodiment, the filtering operation is not performed directly on the backup table collection 356 but, rather, is performed directly on the table node 350. In either case, the backup table collection 356 is maintained in memory so that it can be used to reconstruct the table node 350 if necessary.

Regardless of how it is generated, the filtered table node 357 may then be provided to the requesting client 220 according to a specified view 251, 252 (e.g., as a user-navigable table embedded within a Web page).

Figure 1A:
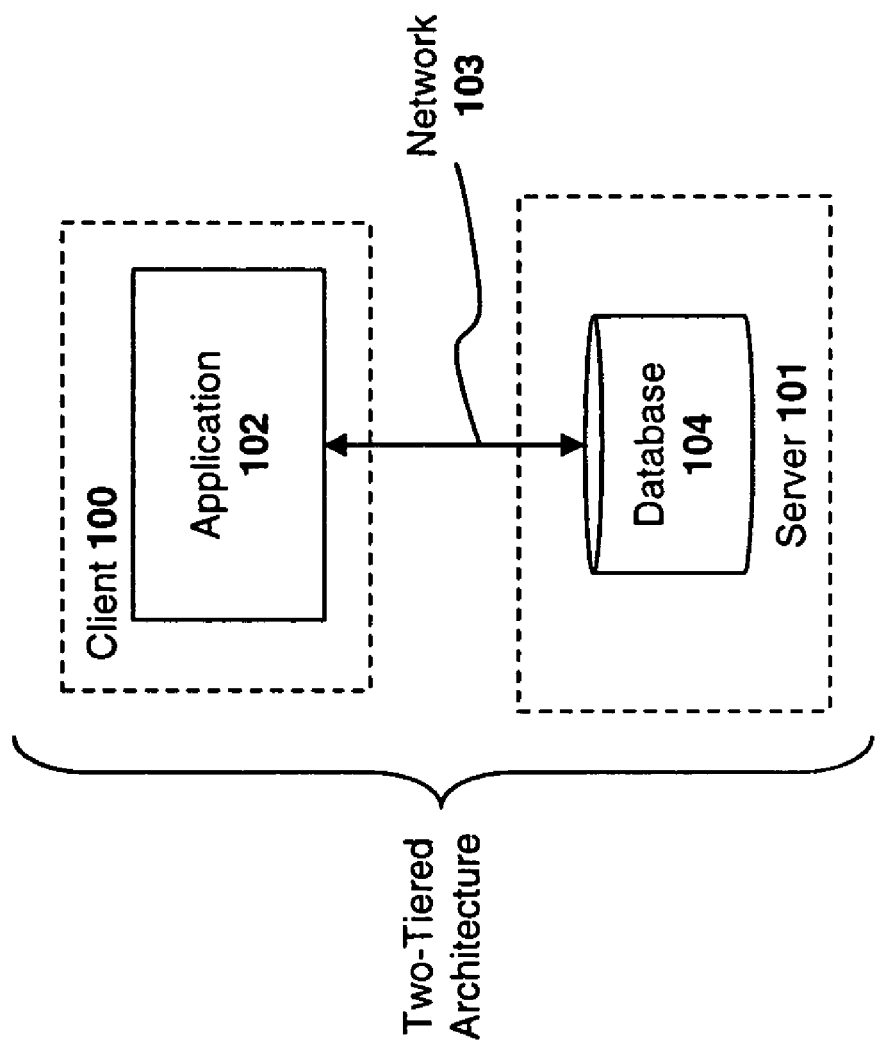
FIG. 1a illustrates a traditional two-tier client-server architecture.
Figure 1B:
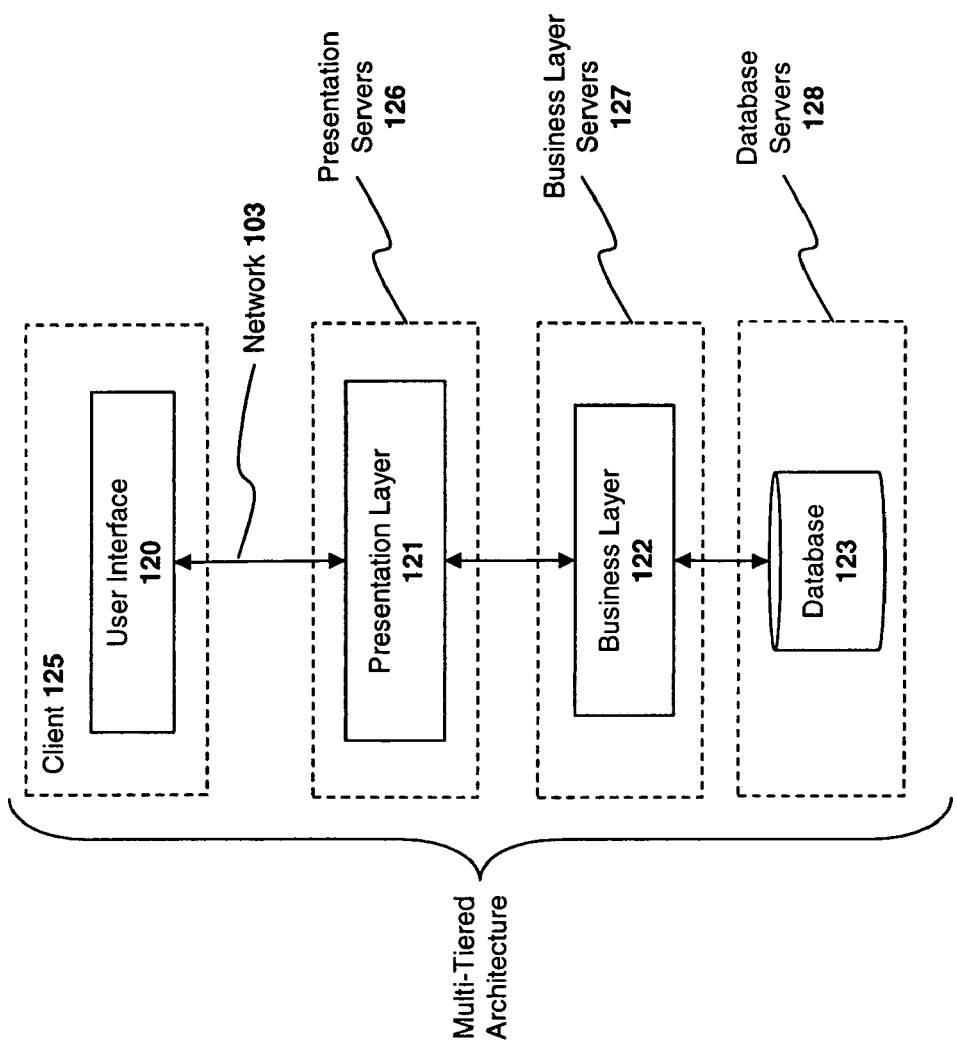
FIG. 1b illustrates a prior art multi-tier client-server architecture.
Figure 2A:
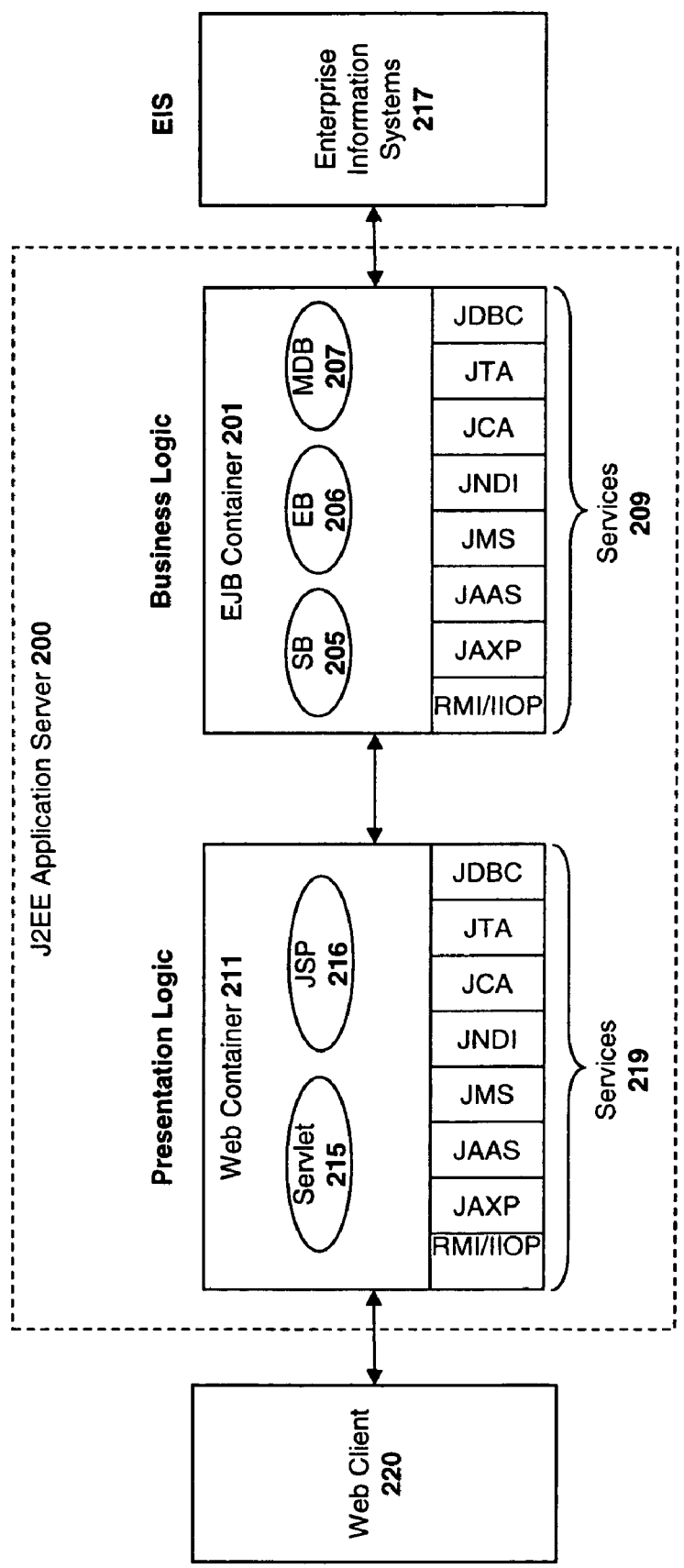
FIG. 2a illustrates a multi-tiered application server architecture according to the Java 2 Enterprise Edition ("J2EE") standard.
Figure 2B:
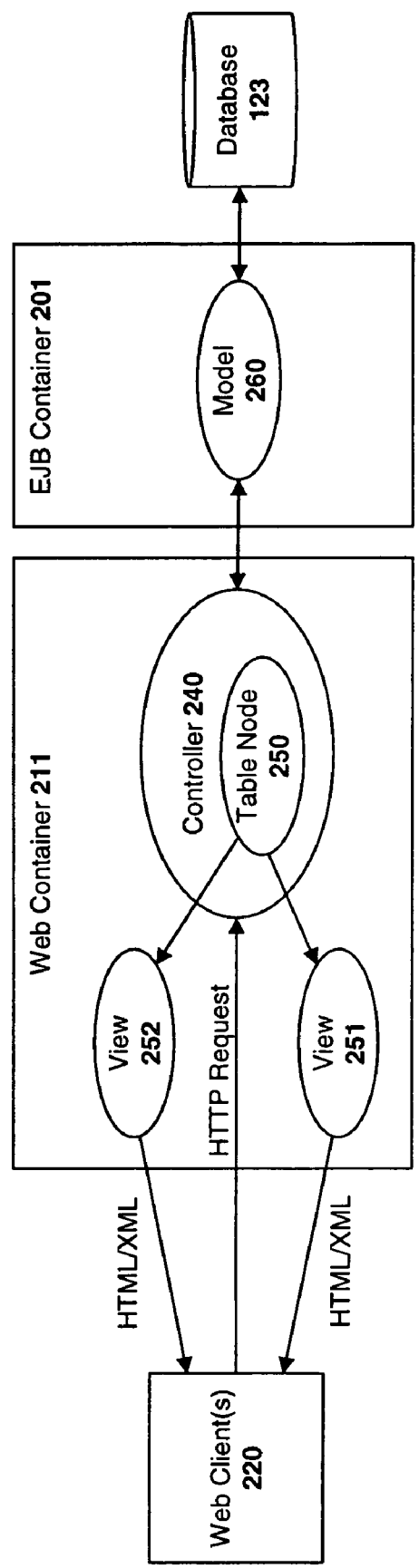
FIG. 2b illustrates a model view controller ("MVC") architecture implemented within a J2EE architecture.
Figure 4:
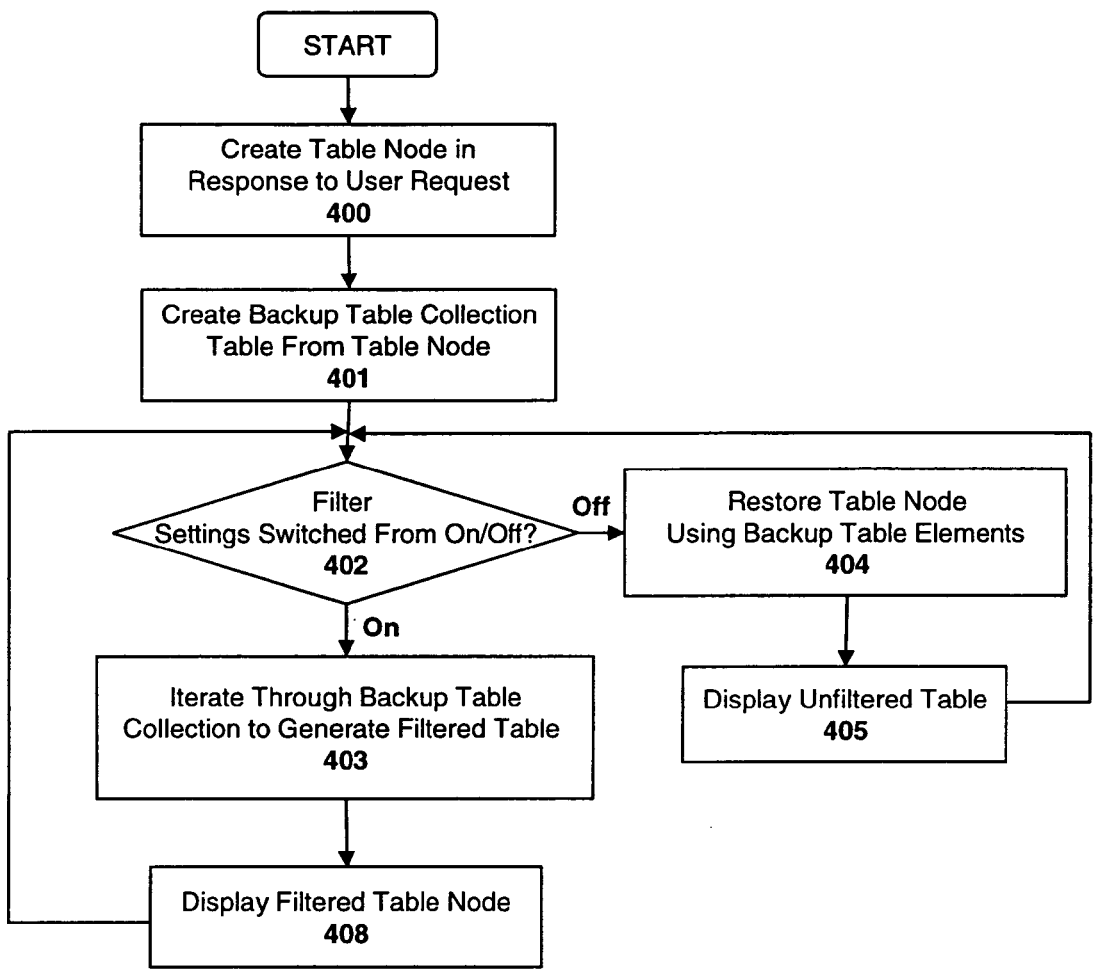
FIG. 4 illustrates one embodiment of a method for efficiently filtering and restoring tables within an enterprise network.

FIG. 4 illustrates a method for performing filtering operations on tables and/or table data according to one embodiment of the invention. At 400 a table node 350 is created in response to a user request (e.g., an HTTP request from a Web browser). To generate the table node 350 data may be retrieved from the central database 123 and embedded within the table node 350 (e.g., via a "model" component within the business layer as indicated in FIG. 2b). At 401, a backup table collection 356 is created from table node 350. In one embodiment, the backup table collection 356 is created in response to a user-initiated implementation of a filtering function (e.g., a user specifying filtering criteria via a Web browser or other graphical user interface).

At 402 a determination is made as to whether the filter settings are being switched from 'on' to 'off' or from 'off' to 'on.' If the filter settings are switched from 'off' to 'on,' then at 403a filtered table node 357 is generated by iterating through each element in the backup table collection 356 and comparing the element with the specified filtering criteria. Elements which match the filtering criteria are copied to the filtered table node 357. A specified view 251, 252 containing the filtered data may then be generating for the end user. When the last element in the backup table collection 356 is reached, the filtered table node 357 is complete.

If, at 402, the filter settings are switched from 'on' to 'off,' then the unfiltered table node 350 is restored from the backup table collection 356. IN particular each element within the backup table collection is coped to the table node 350. Consequently, the original table node 350 is restored without use of the supply functions.

Figure 5:
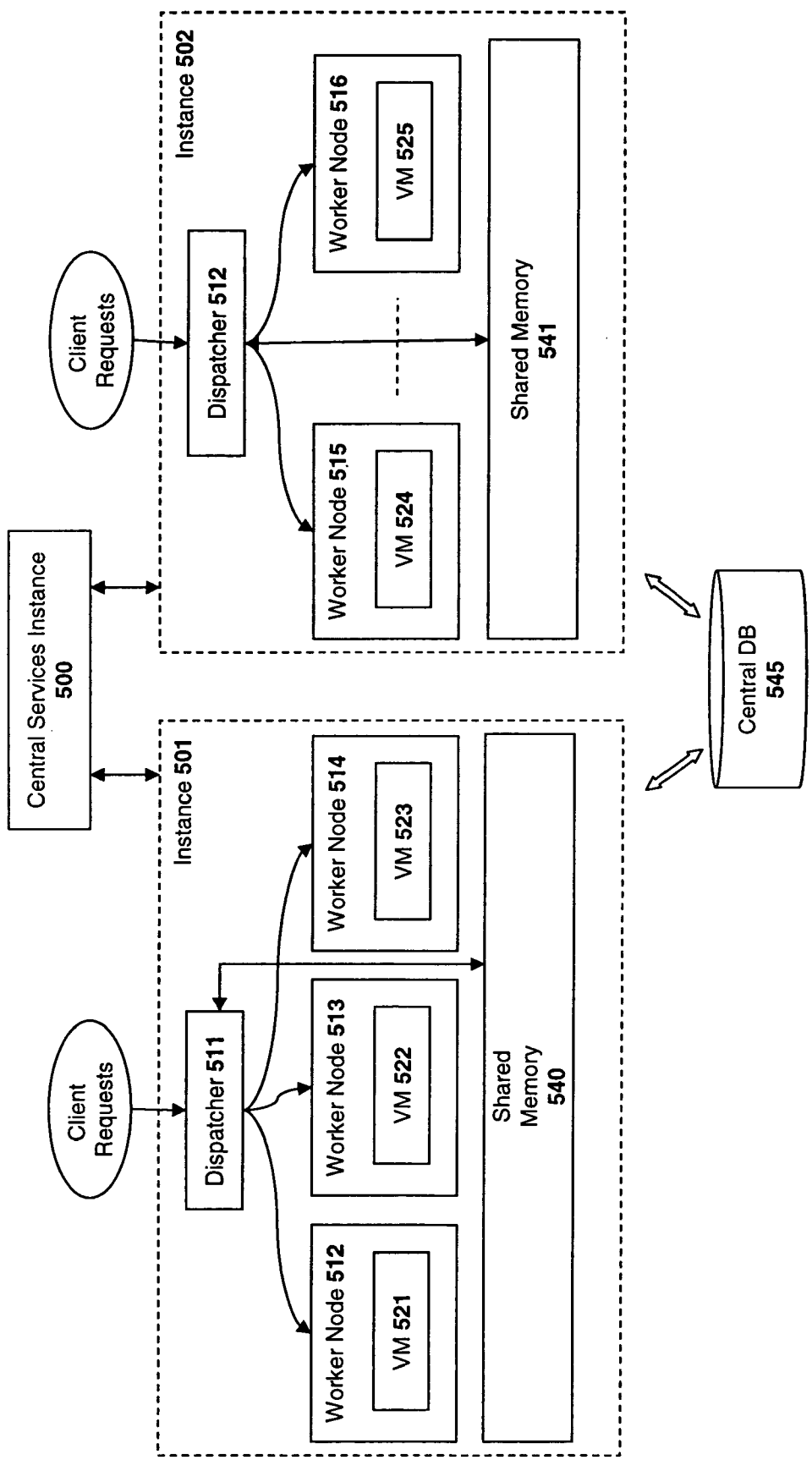
FIG. 5 illustrates one embodiment of a high-level system architecture on which embodiments of the invention may be implemented.

A system architecture on which embodiments of the invention may be implemented is illustrated in FIG. 5. The architecture includes a plurality of application server "instances" 501 and 502. The application server instances 501 and 502 each include a group of worker nodes 512-514 and 515-516 (also sometimes referred to herein as "server nodes"), respectively, and a dispatcher 511 and 512, respectively. The application server instances 501, 502 communicate through a central services instance 500 using message passing. In one embodiment, the central services instance 500 includes a locking service and a messaging service (described below). The combination of all of the application server instances 501 and 502 and the central services instance 500 is referred to herein as a "cluster." Although the following description will focus solely on instance 501 for the purpose of explanation, the same principles apply to other instances within the cluster.

The worker/server nodes 512-514 within instance 501 provide the business and presentation logic for the network applications supported by the system including, for example, the Web container 211 and the EJB container functionality describe herein. Each of the worker nodes 512-514 within a particular instance may be configured with a redundant set of programming logic and associated data, represented as virtual machines 521-523 in FIG. 5. In one embodiment, the dispatcher 511 distributes service requests from clients to one or more of the worker nodes 512-514 based on the load on each of the servers. For example, in one embodiment, the dispatcher maintains separate queues for each of the 512-514 in a shared memory 540. The dispatcher 511 fills the queues with client requests and the worker nodes 512-514 consume the requests from each of their respective queues. The client requests may be from external clients (e.g., browser requests) or from other components/objects within the instance 501 or cluster.

In one embodiment, the worker nodes 512-514 may be Java 2 Enterprise Edition ("J2EE") worker nodes which support Enterprise Java Bean ("EJB") components and EJB containers (at the business layer) and Servlets and Java Server Pages ("JSP") (at the presentation layer). In one embodiment, JSPs are used to implement the different views 251 and 252, and servlets are used to implement the controllers 340 illustrated in FIG. 3. In this embodiment, the virtual machines 521-525 implement the J2EE standard (as well as the additional non-standard features described herein). It should be noted, however, that certain high-level features described herein may be implemented in the context of different software platforms including, by way of example, Microsoft .NET platforms and/or the Advanced Business Application Programming ("ABAP") platforms developed by SAP AG, the assignee of the present application.

In one embodiment, communication and synchronization between each of the instances 501, 502 is enabled via the central services instance 500. As mentioned above, the central services instance 500 includes a messaging service and a locking service. The message service allows each of the servers within each of the instances to communicate with one another via a message passing protocol. For example, messages from one server may be broadcast to all other servers within the cluster via the messaging service (e.g., such as the cache configuration messages described below). Alternatively, messages may be addressed directly to specific servers within the cluster (i.e., rather than being broadcast to all servers). In one embodiment, the locking service disables access to (i.e., locks) certain specified portions of configuration data and/or program code stored within a central database 545. The locking service locks data on behalf of various system components which need to synchronize access to specific types of data and program code. In one embodiment, the central services instance 500 is the same central services instance as implemented within the Web Application Server version 6.3 and/or 6.4 developed by SAP AG. However, the underlying principles of the invention are not limited to any particular type of central services instance.

In addition, unlike prior systems, one embodiment of the invention shares objects across virtual machines 521-525. Specifically, in one embodiment, objects such as session objects which are identified as "shareable" are stored within a shared memory region 540, 541 and are made accessible to multiple virtual machines 521-525. Creating new object instances from scratch in response to client requests can be a costly process, consuming processing power and network bandwidth. As such, sharing objects between virtual machines as described herein improves the overall response time of the system and reduces server load.

In a shared memory implementation, a shared memory area 540, 541 or "heap" is used to store data objects that can be accessed by multiple virtual machines 521-525. The data objects in a shared memory heap should generally not have any pointers or references into any private heap (e.g., the private memory regions/heaps of the individual virtual machines). This is because if an object in the shared memory heap had a member variable with a reference to a private object in one particular virtual machine, that reference would be invalid for all the other virtual machines that use that shared object.

More formally, this restriction can be thought of as follows: For every shared object, the transitive closure of the objects referenced by the initial object should only contain shared objects at all times. Accordingly, in one implementation of the invention, objects are not put into the shared memory heap by themselves—rather, objects (such as the session objects described herein) are put into the shared memory heap in groups known as "shared closures." A shared closure is an initial object plus the transitive closure of all the objects referenced by the initial object.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details.

For example, although many of the embodiments set forth above relate to a Java or J2EE implementation, the underlying principles of the invention may be implemented in virtually any enterprise networking environment. Moreover, although some of the embodiments set forth above are implemented within a shared memory environment, the underlying principles of the invention are equally applicable to a non-shared memory environment. Finally, it should be noted that the terms "client" and "server" are used broadly to refer to any applications, components or objects which interact via remote method invocations.

Accordingly, the scope and spirit of the invention should be judged in terms of the claims which follow.

What is claimed is:

1. A computer implemented method comprising:
    processing program code with one or more processors to perform the following:
    persisting elements of a table node into a database, the table node within a web container;
    detecting that a filtering function has been selected for the table node;
    in response to the detecting that the filtering function has been selected for the table node, storing the elements from the table node into a backup table collection, the backup table collection within the web container;
    performing the filtering function on the backup table collection's contents to generate a filtered table node, the filtered table node containing a subset of the elements as specified by the filtering function, the filtered table node within the web container, the performing of the filtering function on the backup table collection's contents comprising:
        iterating through each of the elements in the backup table collection;
        comparing each of the elements within the backup table collection with filtering criteria specified by the filtering function; and
        copying particular elements which match the filtering criteria into the filtered table node, the particular elements being the subset of elements; and,
    applying a view to the filtered table node, the view defining how the filtered table node is displayed.

2. The method as in claim 1 wherein said view defines how the filtered table node is displayed within a Web page.

3. The method as in claim 1 further comprising:
    initially generating the table node in response to a hypertext transport protocol (HTTP) request received from a Web client.

4. The method as in claim 3 further comprising before the detecting:
    retrieving table data from the database; and
    populating the table node with the table data.

5. A system having memory with program code coupled to one or more processors, wherein, the program code is read from the memory and processed by one or more processors, the system comprising:
    a controller within a web container to detect that a filtering function has been selected for a table node, the controller to store elements from the table node into a backup table collection in response to the detection of the selection of the filtering function;
    a filter operation module to perform the filtering function to generate a filtered table node from the backup table collection, the filtered table node within the container, the filtered table node containing a subset of the elements as specified by the filtering function, wherein, in performing the filtering function when generating the filtered table node form the backup table collection, the filter operation module performs the operations of:
        iterating through each of the elements in the backup table collection
        comparing each of the elements within the backup table collection with filtering criteria specified by the filtering function; and
        copying the particular elements which match the filtering criteria into the filtered table node; and,
    a view component within the web container to describe a display of the filtered table node, wherein, said table node, backup table collection and filtered table node are also implemented within the web container, the web container being external to a database system that also persists the elements.

6. The system as in claim 5 wherein the controller initially generates the table node in response to a hypertext transport protocol (HTTP) request received from a Web client.

7. The system as in claim 6 wherein the controller additionally retrieves table data from the database and populates the table node with the table data before the detecting.

8. A machine-readable storage medium having stored thereon program code which, when executed by one or more processors, causes the processors to perform the operations of:
    detecting that a filtering function has been selected for a table node;
    in response to the detecting that the filtering function has been selected, storing elements from the table node within a backup table collection, the elements also being persisted within a database system;
    performing the filtering function on the table node's contents to generate a filtered table node, the filtered table node containing a subset of the elements as specified by the filtering function, wherein, in performing the filtering function when generating the filtered table node from the table node's contents, the following operations are performed:
    iterating through each of the elements in the table node;
    comparing each of the elements within the table node with filtering criteria specified by the filtering function; and
    copying the particular elements which match the filtering criteria into the filtered table node;
    applying a view to the filtered table node, the view defining how the filtered table node is displayed, wherein, said table node, backup table collection and filtered table node are implemented within a web container, the table node and the filtered table within a controller within the Web container
    detecting that the filtering function has been disabled, and
    restoring the table node from the backup table node collection, the restoring being responsive to the detecting.

9. The machine-readable storage medium as in claim 8 wherein the view defines how the filtered table node is displayed within a Web page.

10. The machine-readable storage medium as in claim 8 comprising additional program code to cause the machine to perform the operations of:
    initially generating the table node in response to a hypertext transport protocol (HTTP) request received from a Web client.

11. The machine-readable storage medium as in claim 10 comprising additional program code to cause the one or more processors to perform the operations of before the detecting:
    retrieving table data from said database; and
    populating the table node with the table data.

* * * * *